US007876821B2

(12) United States Patent
Li et al.

(10) Patent No.: US 7,876,821 B2
(45) Date of Patent: Jan. 25, 2011

(54) METHOD AND AN APPARATUS FOR CONTROLLING THE RATE OF A VIDEO SEQUENCE; A VIDEO ENCODING DEVICE

(75) Inventors: Zhengguo Li, Singapore (SG); Feng Pan, Singapore (SG); Keng Pang Lim, Singapore (SG); Dajun Wu, Singapore (SG); Rongshan Yu, Singapore (SG); Genan Feng, Singapore (SG); Dusheng Wang, Dallan (CN)

(73) Assignee: Agency for Science, Technology and Research, Singapore (SG)

( * ) Notice: Subject to any disclaimer, the term of this patent is extended or adjusted under 35 U.S.C. 154(b) by 1265 days.

(21) Appl. No.: 10/528,363

(22) PCT Filed: Sep. 5, 2002

(86) PCT No.: PCT/SG02/00206

§ 371 (c)(1),
(2), (4) Date: Oct. 3, 2005

(87) PCT Pub. No.: WO2004/023821

PCT Pub. Date: Mar. 18, 2004

(65) Prior Publication Data

US 2006/0140270 A1 Jun. 29, 2006

(51) Int. Cl.
*H04B 1/66* (2006.01)
*H04N 7/12* (2006.01)
*H04N 11/02* (2006.01)
*H04N 11/04* (2006.01)

(52) U.S. Cl. .............................. 375/240.12; 375/240.14
(58) Field of Classification Search ............ 375/240.12, 375/240.14
See application file for complete search history.

(56) References Cited

U.S. PATENT DOCUMENTS 4,744,787 A 5/1988 Phipps et al.

(Continued)

FOREIGN PATENT DOCUMENTS

EP 0 892 555 A2 1/1999

(Continued)

OTHER PUBLICATIONS

"A Novel Rate Control Scheme for Video Over the Internet", Li et al., Proceedings ICASSP 02, IEEE Int. Conf. on Acoustics, Speech and Signal Processing, vol. 2, pp. 2065-2068.*

(Continued)

*Primary Examiner*—Marsha D Banks Harold
*Assistant Examiner*—Jessica Roberts
(74) *Attorney, Agent, or Firm*—Paul J. Backofen, Esq.; Niky Economy Syrengelas, Esq.; Crockett & Crockett, PC

(57) ABSTRACT

A method for rate control for encoding video sequence, wherein the video sequence includes a plurality of Group Of Pictures, wherein each Group of Picture includes at least and I-frame and an Inter-frame, where the rate control method includes the following steps for the encoding of the Inter-frame in the Group of Picture: determining a desired frame rate based on an available bandwidth of a channel for transmitting the video sequence and an available computational resources for the encoding process; determining a target buffer level based on the desired frame rate and the position of the Inter-frame with respect to the I-frame; and determining a target bit rate based on the target buffer level and the available channel bandwidth, wherein the target bit rate is used for controlling the rate of encoding the video sequence.

25 Claims, 4 Drawing Sheets

U.S. PATENT DOCUMENTS

| | | | |
|---|---|---|---|
| 5,134,476 | A | 7/1992 | Aravind et al. |
| 5,147,297 | A | 9/1992 | Myers et al. |
| 5,320,731 | A | 6/1994 | Muller et al. |
| 5,405,317 | A | 4/1995 | Myers et al. |
| 5,573,503 | A | 11/1996 | Untereker et al. |
| 5,685,837 | A | 11/1997 | Horstmann |
| 5,717,464 | A | 2/1998 | Perkins et al. |
| 5,872,598 | A | 2/1999 | Legall et al. |
| 6,043,844 | A | 3/2000 | Bist et al. |
| 6,091,774 | A | 7/2000 | Hyodo et al. |
| 6,091,776 | A | 7/2000 | Linzer |
| 6,118,817 | A * | 9/2000 | Wang .................... 375/240.03 |
| 6,141,380 | A | 10/2000 | Krishnamurthy et al. |
| 6,181,742 | B1 * | 1/2001 | Rajagopalan et al. ....... 375/240 |
| 6,212,232 | B1 | 4/2001 | Reed et al. |
| 6,219,343 | B1 | 4/2001 | Honkasalo et al. |
| 6,229,849 | B1 | 5/2001 | Mihara |
| 6,256,350 | B1 * | 7/2001 | Bishay et al. .......... 375/240.21 |
| 6,263,020 | B1 | 7/2001 | Gardos et al. |
| 6,366,614 | B1 * | 4/2002 | Pian et al. .............. 375/240.02 |
| 6,567,117 | B1 * | 5/2003 | Nago et al. ................. 348/180 |
| 6,731,685 | B1 * | 5/2004 | Liu et al. ............... 375/240.14 |
| 6,731,977 | B2 | 5/2004 | Beck |
| 2003/0028170 | A1 | 2/2003 | Anderson et al. |

FOREIGN PATENT DOCUMENTS

| | | |
|---|---|---|
| JP | 10-304360 | 11/1998 |
| JP | 2000-102008 | 4/2000 |
| JP | 2001-251621 | 9/2001 |
| WO | WO 98/37701 A1 | 8/1998 |
| WO | WO 99/52295 A1 | 10/1999 |

OTHER PUBLICATIONS

"A Novel Rate Contal Scheme for Video Over the Internet", Li et al., Proceedings ICASSP 02, IEEE Int. Conf. on Acoustics, Speech and Signal Processing, vol. 2, pp. 2065-2068.*

"Scalable Rate Control for MPEG-4 Video", Lee et al., IEEE Transactions on Circuits and Systems for Video Technology, vol. 10, Issue 6, Sep. 2000, pp. 878-894.

"A New Rate Control Scheme Using Quadratic Rate Distortion Model", Chiang et al., IEEE Trans. on Cir. and Systems for Video Technology, vol. 7, Issue 1, Feb. 1999, pp. 246-255.

"Rate Control in DCT Video Coding for Low-delay Communications", Ribas-Corbera et al., IEEE Trans. on Cir. and Systems for Video Technology, vol. 9, Issue 1, Feb. 99, pp. 172-185.

"MPEG-4 Rate Control for Multiple Video Objects", Vetro et al., IEEE Transactions on Circuits and Systems for Video Technology, vol. 9, Issue 1, Feb. 1999, pp. 186-199.

"A Novel Rate Control Scheme for Video Over the Internet", Li et al., Proceedings ICASSP 02, IEEE Int. Conf. on Acoustics, Speech, and Signal Processing, vol. 2, pp. 2065-2068.

"Packetization Algorithms For MPEG-4 Fine Granularity Scalability Over The Internet", Li et al., In the 3rd Workshop and Exhibition on MPEG-4, USA, Jun. 2002, pp. 17-20.

"MINMAX Frame Rate Control Using a Rate-Distortion Optimized Wavelet Coder", Yang et al., IEEE Int. Conf. on Image Processing, 1999, vol. 3, Oct. 24-28, 1999, pp. 551-555.

"Optimal Multidimensional Bit-rate Control for Video Communication", Reed et al., IEEE Transactions on Image Processing, vol. 11, Issue 8, Aug. 2002, pp. 873-885.

"Digital Video for the Next Millenium", Video Development Initiative (ViDe), White Paper, Apr. 99. (http://www.vide.net/resources/whitepapers/video/video.pdf).

* cited by examiner

METHOD AND AN APPARATUS FOR CONTROLLING THE RATE OF A VIDEO SEQUENCE; A VIDEO ENCODING DEVICE

CROSS-REFERENCE TO RELATED APPLICATIONS

Not Applicable

STATEMENT REGARDING FEDERALLY SPONSORED RESEARCH OR DEVELOPMENT.

Not Applicable

THE NAMES OF THE PARTIES TO A JOINT RESEARCH AGREEMENT.

Not Applicable

INCORPORATION BY REFERENCE OF MATERIAL SUBMITTED ON A COMPACT DISC

Not Applicable

FIELD OF THE INVENTION

This invention relates to a method and an apparatus for controlling the rate for encoding a video sequence and a video encoding device, wherein the available channel bandwidth and computational resources are taken into account.

BACKGROUND OF THE INVENTION

Rate control plays an important role in the encoding of live video over a channel with a limited bandwidth, for example over an Internet or a wireless network, and has been widely studied by many researchers. Existing results on rate control as disclosed in [1], [2], [3], [4] are based on the assumption that the computational resources are always sufficient and hence, the desired encoding frame rate is always guaranteed.

However when a live video is encoded via software under a multi-task environment, the computational resources of the Central Processing Unit (CPU) may not always be sufficient for the encoding process. This is due to the fact that the computational resources of the CPU may be taken up by other processes having a higher priority. In real time video coding systems, encoded bits are stored in a buffer before they are transmitted over the network to a decoder. When insufficient computational resources are allocated for the encoding process, the actual encoding frame rate is less than the desired frame rate, and the number of generated bits stored in buffer is too low. As a result, the available channel bandwidth is wasted. This phenomenon is especially common when the video encoding process is implemented on a handheld device with limited computational capabilities.

Also, most existing rate control methods are focused on the case that the available channel bandwidth for the transmission of the video is. constant. However, when the live video is transmitted over a limited bandwidth channel like the Internet or a wireless network, the available channel bandwidth for the transmission of the video usually varies over time. When the available bandwidth of the channel decreases, the number of bits in the buffer accumulates. When the number of bits in the buffer is too large, the encoder usually skips some frames to reduce the buffer delay and to avoid buffer overflow. Frame skipping produces undesirable motion discontinuity in the video sequence.

A recent teaching in reference [5] discloses a rate control method that can adapt the encoding rate to the varying available bandwidth. The rate control method uses a fluid-flow model to compute a target bit rate for each frame of the video sequence. However, the rate control method as disclosed in [5] does not take into account the available computational resources. Moreover, the total number of bits allocated to each Group of Pictures (GOP) are distributed to each P frame in the GOP evenly.

BRIEF SUMMARY OF THE INVENTION

It is an object of the invention to provide a rate control method that is suitable for live video encoding process with bandwidth.

The object is achieved by a method for controlling the rate for encoding a video sequence, wherein the video sequence comprises a plurality of Group Of Pictures (GOP), wherein each Group of Picture comprises at least an I-frame and an Inter-frame, the method comprising the following steps for the encoding of each Inter-frame in the Group of Picture; determining a desired frame rate based on an available bandwidth of a channel for transmitting the video sequence and on available computational resources for the encoding process; determining a target buffer level based on the desired frame rate and the position of the Inter-frame with respect to the I-frame; and determining a target bit rate based on the target buffer level and the available channel bandwidth, wherein the target bit rate is used for controlling the rate for encoding the video sequence.

A GOP of the video sequence is assumed to comprise an I-frame (an Intra-frame, i.e. a frame, which is completely encoded without performing motion estimation and motion compensation) and a plurality of P-frames (Predictive-frames, i.e. frames which are encoded using motion estimation and motion compensation) or B-frames (Bi-directional-frames, i.e. frames which are encoded using motion estimation and motion compensation from two adjacent Intra-frames) as Inter-frames. The bits are allocated to the I-frame based on its complexity, and the bits are allocated to each Inter-frame, preferably of each P-frame, using the rate control method according to the invention.

Although the rate control method, in particular the determining of the target buffer level and the corresponding target bit rate, is performed preferably on the P-frames of the GOPs, it should however be noted that the rate control method according to the invention may also be performed on the B-frames.

When encoding the Inter-frame, preferably the P-frame, a desired frame rate is first determined based on the available channel bandwidth and the available computational resources for the encoding process. The desired frame rate does not remain constant, but changes adaptively for each Inter-frame depending on the available channel bandwidth and the available computational resources.

When the available computational resources are insufficient to achieve the desired frame rate, the encoded bits accumulated in the encoder buffer is therefore low, resulting in buffer underflow and wastage of channel bandwidth. A target buffer level is therefore predefined to prevent buffer underflow by taking into account the available computational resource for the encoding process.

The target buffer level defines how the total number of bits which are allocated to the GOP are to be distributed to each Inter-frame (preferably P-frame) of the GOP, i.e. the budget for each Inter-frame. However, there is normally a difference between the budget of each Inter-frame and the actual bits used by it. To ensure that each Inter-frame, and hence each GOP, uses its own budget, the target bit rate for each Inter-frame is computed. The target bit rate is computed using a fluid flow model and linear system control theory, and taking into account the target buffer level and the available channel bandwidth.

The desired frame rate is determined by determining a target encoding time interval for the Inter-frame, preferably the P-frame, i.e. the time needed for encoding the Inter-frame. The target encoding time is inversely proportional to the desired frame rate, and is determined based on the available bandwidth and also preferably based on an average encoding time. The average encoding time interval for encoding the Inter-frame is proportional to the computational resources, and hence is indicative of the available computational resources. The available bandwidth can be estimated using the method disclosed in [6].

The target encoding time interval for encoding the Inter-frame is determined using the following equations:

$$T_{fi}(n) = A_1 * T_{fi}(n-1) \text{ if } B_{mad}(n) > B_1 * TB_{mad}(n),$$

$$T_{fi}(n) = A_2 * T_{fi}(n-1) \text{ if } B_{mad}(n) < B_2 * TB_{mad}(n),$$

$$T_{fi}(n) = T_{fi}(n-1) \text{ otherwise,}$$

wherein $T_{fi}(n)$ is the target encoding time interval or the target time needed to encode the Inter-frame, $A_1$ is a parameter wherein $0.80 < A_1 < 1.00$, $A_2$ is a parameter wherein $1.00 < A_2 < 1.10$, $B_1$ is a parameter wherein $1.00 < B_1 < 2.00$, $B_2$ is a parameter wherein $0 < B_2 < 1.00$, $TB_{mad}(n)$ is the average of $B_{mad}(n)$, and $B_{mad}(n)$ is related to the average encoding time interval $T_{ave}$ by $$B_{mad}(n) = \frac{u(n) \max\{T_{ave}(n-1), T_{fi}(n-1)\}}{MAD(n)}$$

wherein u(n) is the available channel bandwidth, $T_{ave}(n-1)$ is the average encoding time interval for the Inter-frame, and MAD(n) is the mean absolute difference between the current frame and the previous frame.

According to the invention, $A_1$ is preferably set at 0.9, $A_2$ is preferably set at 1.05, $B_1$ is preferably set at 1.5, and $B_2$ is preferably set at 0.25.

The value of the target encoding time interval $T_{fi}(n)$ obtained is preferably further adjusted using the following equation:

$$T_{fi}(n) = \min\left\{\frac{5}{4F_r}, \max\left\{\frac{3}{4F_r}, T_{fi}(n)\right\}\right\}.$$

The target encoding time interval $T_{fi}(n)$ is inversely related to the desired frame rate.

The average encoding time interval is determined using information on an actual encoding time interval for encoding the Inter-frame, the target encoding time interval, and the number of skipped frames due to buffer overflow.

The average encoding time interval is determined using the following equation:

$$T_{ave}(n) = (1-x)T_{ave}(n-1) + \chi * \max\left\{T_c(n), \frac{1}{F_r} - RT_{st}(n-1)\right\}$$

wherein $T_{ave}(n)$ is the average time interval for encoding the Inter-frame, $\chi$ is a weighting factor, $T_c(n)$ is the actual time for encoding the Inter-frame, $F_r$ is a predefined frame rate, and $RT_{st}$ is further defined as $$RT_{st}(n) = 0 \text{ if } \max\{T_c(n), T_{fi}(n)\} < \frac{1}{F_r} - RT_{st}(n-1) \text{ or } N_{post}(n) > 0,$$

$$RT_{st}(n) =$$

$$\max\{T_c(n), T_{fi}(n)\} + RT_{st}(n-1) - \frac{\lfloor (\max\{T_c(n), T_{fi}(n)\} + RT_{st}(n-1))F_r \rfloor}{F_r}$$

otherwise, wherein $N_{post}(n)$ is the number of skipped frames due to buffer overflow and the $\lfloor a \rfloor$ refers to the largest integer less than a.

The use of the sliding window based method for computing $T_{fi}(n)$ has the advantage of reducing the effect of burst noise on the overall performance of the whole encoding process.

This simple method of adjusting the desired frame rate according to the invention is able to keep the quality of Inter-frames in a tolerable range under time-varying channel bandwidth and sudden motion change without obvious degradation in the perceptual motion smoothness.

The desired frame rate is determined using information on the average encoding time interval $T_{ave}(n)$, and hence based on the available computational resources.

In each GOP, the target buffer level in each frame is predefined in a manner such that the more bits are allocated to the Inter-frames, preferably P-frames nearer to the I-frame of the GOP than the Inter-frames which are further away and belonging to the same GOP. In this way, Inter-frames which are near to the I-frame are encoded with a high quality, and subsequent Inter-frames which are predicted from these high quality Inter-frames are also of a high quality. As a result, the prediction gain based on these Inter-frames is improved.

The target buffer level for the Inter-frame is predefined and determined using the following equation:

$$\text{Target}(n) = \text{Target}(n-1) - \frac{B_c(t_{i,1}) - \delta * B_s}{N_{gop} - 1} * \sum_{j=0}^{N_{post}(n-1)+S_c(n-1)} W_{pos}(n+j)$$

wherein

Target(n) is the target buffer level, $N_{gop}$ is the number of frames in a GOP, $B_s$ is the buffer size, $B_c$ is the actual buffer occupancy after the coding of I-frame, $S_c$ is an average number of frames skipped due to insufficient available computational resources for encoding the Inter-frame according to the desired frame rate, and $W_{pos}(l)$ is the position weight of the $l^{th}$ Inter-frame which satisfies $$\sum_{i=1}^{N_{gop}-1} W_{pos}(l) = N_{gop} - 1$$

and $$W_{pos}(1) \leq W_{pos}(2) \leq \ldots \leq W_{pos}(N_{gop}-1).$$

The average number of skipped frames due to insufficient computational resources is determined based on an instant number of skipped frames $\tilde{S}_c(n)$ due to insufficient computational resources when the Inter-frame is encoded. The instant number of skipped frames due to insufficient computational resources is determined using information on the actual encoding time interval and the target encoding time interval. The determining of the instant number of skipped frames due to insufficient computational resources can be summarized using the following equations:

$$\tilde{S}_c(n) = \lfloor TST(n) * F_r \rfloor$$

wherein $TST(n)$ is further defined as $$TST(n) = \max\left\{0, \tilde{T}\tilde{S}\tilde{T}(n-1) + \max\{T_c(n), T_{fi}(n)\} - \frac{1}{F_r}\right\}$$

and $\tilde{T}\tilde{S}\tilde{T}(n-1)$ is defined as $$\tilde{T}\tilde{S}\tilde{T}(n-1) = TST(n-1) - \frac{\lfloor TST(n-1) * F_r \rfloor}{F_r}$$

wherein
$T_c$ is the actual encoding time interval, and $F_r$ is a predefined frame rate.

The average number of skipped frames due to insufficient computational resources is then determined using the following equation:

$$S_c(n) = \lfloor (1-\theta)S_c(n-1) + \theta * \tilde{S}_c(n) \rfloor$$

wherein $\theta$ is a weighting factor.

The advantage of using the average number of frames skipped $S_c$ instead of an instant number of skipped frames for computing the target buffer level is that the value of $S_c$ changes slowly. This slow change of $S_c$ coincides with a slow adjustment of a quantization parameter Q used for the encoding process of the video.

It should however be noted that in an alternative embodiment of the invention, the instant number of skipped frames $\tilde{S}_c(n)$ can be used instead of the average number of skipped frames $S_c(n)$ to determine the target buffer level.

In the case when the channel bandwidth is constant, the complexity of each frame the same and the desired frame rate is guaranteed, the target buffer level for the $n^{th}$ Inter-frame in the $i^{th}$ GOP can be simplified to become $$\text{Target}(n) = \frac{u}{F_r} - \frac{B_c(t_{i,l}) - \delta * B_s}{N_{gop}-1} * W_{pos}(n)$$

As can be seen from the above equation, the target buffer level of the current Inter-frame is greater than the target buffer level of the subsequent Inter-frames. In other words, more bits are allocated to the Inter-frame which is nearer to the I-frame belonging to the same GOP than the Inter-frame which is further away from the I-frame, i.e. from the Intra-frame.

The target bit rate according to a preferred embodiment of the invention is determined based on the average encoding time interval, the average number of skipped frame due to insufficient computational resource, the target buffer level, the available channel bandwidth and the actual buffer occupancy. In particular, the target bit rate according to a preferred embodiment of the invention is determined using the following equation:

$$\tilde{f}(n) = \max\{0, u(t_{n,i}) * \max\{T_{ave}(n-1), T_{fi}(n)\} + (\gamma-1)(B_c(t_{n,i}) - \text{Target}(n))\}$$

wherein
$\tilde{f}(n)$ is the target bit rate,
$t_{n,i}$ is the time instant the $n^{th}$ Inter-frame in the $i^{th}$ GOP is coded, and
$\gamma$ is a constant.

Since the available channel bandwidth $u(t_{n,i})$ and the average encoding time interval $T_{ave}(n-1)$ are used to determine the target bit rate for the Inter-frame, the bit rate control method according to the invention is adaptive to both the available channel bandwidth and the available computational resources.

The target bit rate for the Inter-frame determined above can be further adjusted by a weighted temporal smoothing using the following equation:

$$f(n) = \max\left\{\frac{u(t_{n,i}) * \max\{T_{ave}(n-1), T_{f,i}(n)\}}{3} + H_{hdr}(n-1),\right.$$
$$\left. \mu \times \tilde{f}(n) + (1-\mu) \times f(n-1)\right\}$$

wherein
$f(n)$ is the smoothed target bit rate,
$\mu$ is a weighting control factor constant, and
$H_{hdr}(n)$ is the amount of bits used for shape information, motion vector and header of previous frame.

It should be noted that in an alternative embodiment, the actual encoding time interval $T_{fi}(n)$ can be used instead of the average encoding time interval $T_{ave}(n)$ for determining the target bit rate. The advantage of using the average encoding time interval $T_{ave}$ instead of $T_c$ for the computation of the target bit rate is that $T_{ave}$ changes slowly. This also coincides with the slow adjustment of the quantization parameter Q for the encoding process of the video sequence. Also when the actual frame rate is less than the predefined frame rate, i.e.

$$T_{ave} > \frac{1}{F_r},$$

more bits are assigned to each frame. Therefore, the possibility of buffer underflow is reduced compared to any existing rate control method, and the utilization of the channel bandwidth is improved.

Once the target bit rate for each Inter-frame is computed, the corresponding quantization parameter for the encoding process can be computed, preferably using the Rate-Distortion (R-D) method described in [5].

In a post-encoding stage of the rate control method according to the invention, a sleeping time of the encoding process is updated using the following equation:

$$ST_c(n) = \max\left\{\frac{1}{F_r} - RT_{st}(n-1) - \max\{T_{fi}(n), T_c(n)\}, 0\right\} + \frac{N_{post}(n)}{F_r}$$

wherein $ST_c(n)$ is the sleeping time of the encoding process. The starting coding time of the next frame is then given by $$SCT(n) = T_c(n) + SCT(n-1) + ST_c(n)$$

wherein $SCT(n)$ is the starting encoding time. The starting decoding time of the next frame is given by $$SDT(n) = \frac{\lfloor SCT(n) * F_r \rfloor}{F_r}$$

wherein $SDT(n)$ is the starting decoding time. The starting decoding time is to be sent to a decoder to provide information on the time for decoding each frame of the encoded video sequence.

Three points should be considered when determining the sleeping time $ST_c(n)$ and the starting decoding time $SDT(n)$ No frame is to be encoded twice, the time resolution is $1/F_r$, and necessary time should be elapsed when the buffer is in danger of overflow.

Other objects, features and advantages according to the invention will be presented in the following detailed description of the illustrated embodiments when read in conjunction with the accompanying drawings.

DETAILED DESCRIPTION OF THE INVENTION

Figure 1:
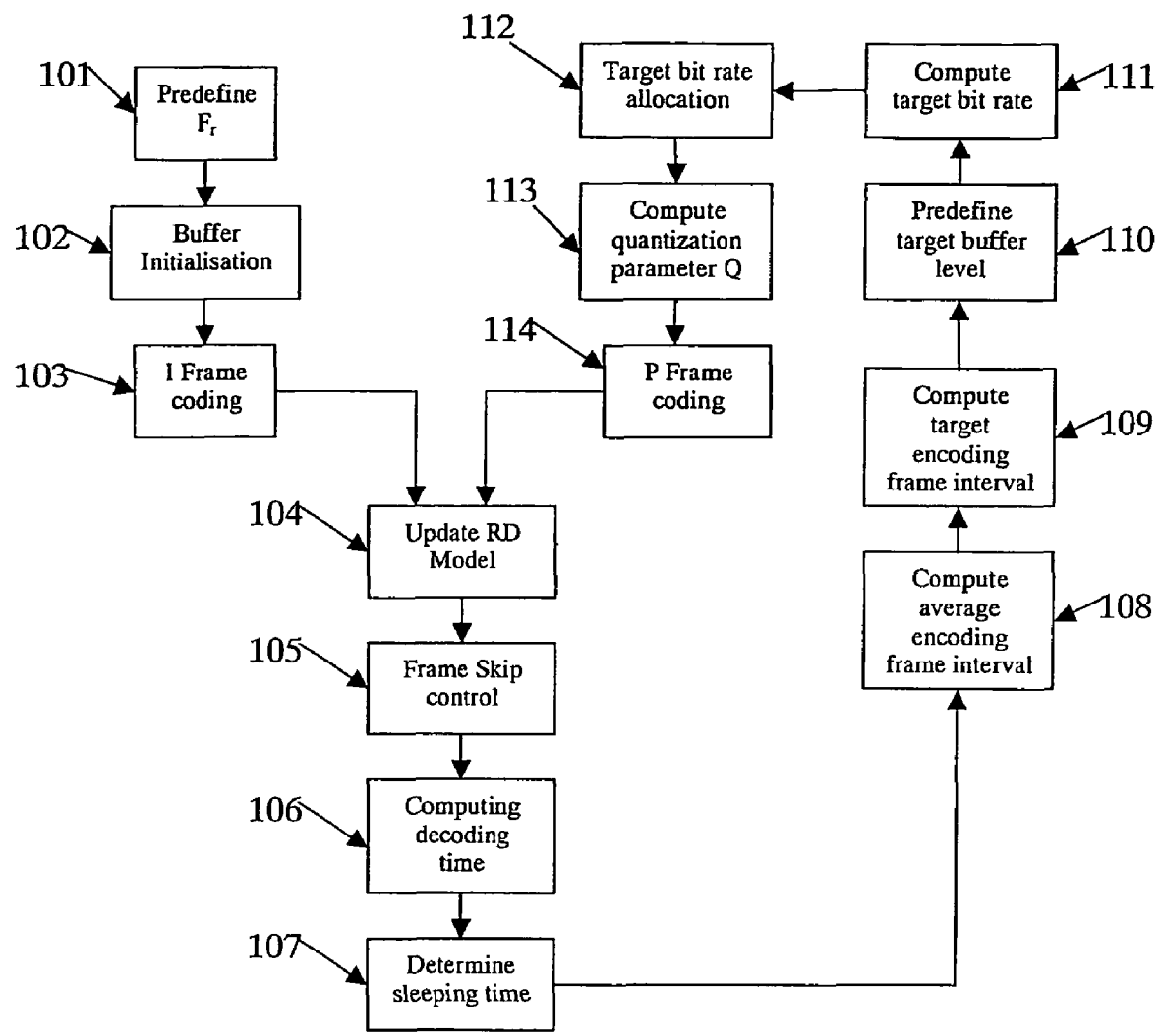
FIG. 1 shows a block diagram of the rate control method according to a preferred embodiment of the invention.

FIG. 1 shows a block diagram of the rate control method according to a preferred embodiment of the invention.

The rate control method according to the invention comprises the following three stages:
the initialization stage,
the pre-encoding stage and
the post-encoding stage.

In step 101, a frame rate $F_r$ is predefined for the encoding process for a Group of Pictures (GOP). Practical issues like the parameters/specifications of the encoder and decoder are to be taken into consideration while choosing a suitable encoding frame rate at this point. Furthermore, it is not always known whether the hardware on which the video encoding process, including the rate control, is implemented can support the predefined frame rate.

In step 102, the buffer size for the video frames is set based on latency requirements. Before the encoding of the I-frame, the buffers are initialized at $B_s * \delta$ wherein $B_s$ is the buffer size and $\delta$ is a parameter defined as $0 \leq \delta \leq 0.5$. The I-frame is then encoded in step 103 using a predefined initial value of quantization parameter $Q_0$. The encoding of the I-frame in step 103 may be implemented using any of the methods described in [1], [3], [4], [5].

After the I-frame is encoded, the parameters of a Rate-Distortion (R-D) model which is subsequently used to determine a suitable quantization parameter for encoding the corresponding frames of the video are updated in the post-encoding stage (step 104). In a further step 105 of the post-encoding stage, the number of skipped frames due to buffer overflow $N_{post}(n)$ is determined, preferably using the method disclosed in [5].

In step 106, a sleeping time $ST_c(n)$ of the encoding process after the current frame is determined, wherein the sleeping time $ST_c(n)$ is used to determine a starting encoding time $SCT(n)$ for the next frame. The determined starting coding time $SCT(n)$ is then used to determine the starting decoding time $SDT(n)$ of the next frame in step 107, wherein the $SDT(n)$ is transmitted to the decoder.

Once the encoding of the I-frame is completed, the next frame, which is an Inter-frame is encoded using the quantization parameter which was determined in the previous post-encoding stage.

When the channel bandwidth or the statistics of the video contents is varying with time, the quality of each frame of the video sequence will vary significantly if the encoding frame rate is fixed at the predefined frame rate $F_r$. To avoid this, a target or desired frame rate is determined in the pre-encoding stage according to the available channel bandwidth and any sudden motion change.

An average encoding time interval $T_{ave}(n)$, or the average time interval needed for encoding an P-frame, is determined in step 108. The average encoding time interval $T_{ave}(n)$ is then used to determined a target encoding time interval $T_{fi}(n)$ in step 109. The target encoding time interval $T_{fi}(n)$ is inversely related to the desired frame rate.

The determined desired frame rate is then used to determine a target buffer level for the P-frame in step 110. In step 111, the target buffer level, the actual buffer occupancy, the available channel bandwidth, the desired frame rate and the average encoding time interval $T_{ave}$ are used to determine a target bit rate $f(n)$ for the P-frame.

Based on the target bit rate $f(n)$, bits are allocated to the P-frame in step 112. The corresponding quantization parameter Q is computed as described in [5] in step 113 using the updated R-D model from step 104. The quantization parameter Q is used to encode the P-frame in step 114.

When the next frame is a P-frame, the R-D model is updated again in step 104 of the post-encoding stage and the whole post-encoding and pre-encoding stage is iterated for encoding the next P-frame. If the next frame is an I-frame of a next Group of Pictures (GOP), the encoding process starts again at step 101 for the encoding of the next I-frame.

The implementation of the steps 108 to 111 of the pre-encoding stage and steps 106 and 107 of the post-encoding stage according to the invention will now be described in detail.

After the coding of an $i^{th}$ I-frame, the initial value of the target buffer level is initialized at $$\text{Target}(0) = B_c(t_{i,l}) \quad (1)$$

wherein $B_c(t_{i,I})$ is the actual buffer occupancy after the coding of the $i^{th}$ I-frame, and $t_{i,I}$ is the time instant that the $i^{th}$ I-frame is coded.

To determine the target bit rate of each P-frame of the GOP, the target buffer level for the P-frame needs to be determined. The first step of determining the target buffer level is to determine the desired frame rate. This is achieved by first determining the average encoding time interval of the P-frame $T_{ave}(n)$ using the following equation (step 108):

$$T_{ave}(n) = (1-\chi)T_{ave}(n-1) + \chi * \max\left\{T_c(n), \frac{1}{F_r} - RT_{st}(n-1)\right\} \quad (2)$$

wherein $\chi$ is a weighting factor, $T_c(n)$ is the actual time for encoding the P-frame, and $RT_{st}$ is defined as $$RT_{st}(n) = 0 \text{ if } \max\{T_c(n), T_{fi}(n)\} < \frac{1}{F_r} - RT_{st}(n-1) \text{ or } N_{post}(n) > 0; \quad (3)$$

$$RT_{st}(n) = \max\{T_c(n), T_{fi}(n)\} + \quad (4)$$
$$RT_{st}(n-1) - \frac{\lfloor(\max\{T_c(n), T_{fi}(n)\} + RT_{st}(n-1))F_r\rfloor}{F_r}$$

otherwise, wherein $\lfloor a \rfloor$ refers to the largest integer less than a.

The weighting factor $\chi$ is $0<\chi<1$, and is preferably set to a value of 0.125. The initial value of the average encoding time interval $T_{ave}(n)$ is given by $$T_{ave}(0) = \frac{1}{F_r} \quad (5)$$

and the initial value of $RT_{st}(n)$ is given by $$RT_{st}(0)=0 \quad (6)$$

A variable $B_{mad}(n)$ is further defined by the following equation:

$$B_{mad}(n) = \frac{u(n)\max\{T_{ave}(n-1), T_{fi}(n-1)\}}{MAD(n)} \quad (7)$$

wherein u(n) is the available channel bandwidth, and

MAD(n) is the mean absolute difference between the current frame and the previous frame.

The available channel bandwidth u(n) can be estimated by the method described in [6].

An average value of $B_{mad}(n)$ is then computed using the following equation:

$$TB_{mad}(n)=(1-\xi)TB_{mad}(n-1)+\xi B_{mad}(n) \quad (8)$$

wherein $TB_{mad}(n)$ is the average value of $B_{mad}(n)$, and $\xi$ is a weighting factor, preferably at a value of 0.125.

After the value of $TB_{mad}(n)$ is computed, the target encoding time interval $T_{fi}(n)$ can be calculated as below (step 109):

$$T_{fi}(n)=A_1*T_{fi}(n-1) \text{ if } B_{mad}(n)>B_1*TB_{mad}(n) \quad (9)$$

$$T_{fi}(n)=A_2*T_{fi}(n-1) \text{ if } B_{mad}(n)<B_2*TB_{mad}(n) \quad (10)$$

$$T_{fi}(n)=T_{fi}(n-1) \text{ otherwise.} \quad (11)$$

wherein $A_1$ is a parameter wherein $0.80<A_1<1.00$, $A_2$ is a parameter wherein $1.00<A_2<1.10$, $B_1$ is a parameter wherein $1.00<B_1<2.00$, and $B_2$ is a parameter wherein $0<B_2<1.00$.

The value of the target encoding time interval $T_{fi}(n)$ determined from equations (9), (10) or (11) may further be adjusted using the following equation:

$$T_{fi}(n) = \min\left\{\frac{5}{4F_r}, \max\left\{\frac{3}{4F_r}, T_{fi}(n)\right\}\right\} \quad (12)$$

wherein the initial value of $T_{fi}(n)$ is given by $$T_{fi}(0) = \frac{1}{F_r}. \quad (13)$$

After the desired frame rate is determined from the inverse of the target encoding time interval $T_{fi}(n)$, the average number of frames skipped due to insufficient computational resources $S_c(n)$ is determined in order to determine the target buffer level.

Two time variables are defined as follow:

$$T\tilde{S}T(n-1) = TST(n-1) - \frac{\lfloor TST(n-1)*F_r\rfloor}{F_r} \quad (14)$$

$$TST(n) = \max\left\{0, T\tilde{S}T(n-1) + \max\{T_c(n), T_{fi}(n)\} - \frac{1}{F_r}\right\} \quad (15)$$

wherein the initial value of TST(n) is given by $$TST(0)=0 \quad (16)$$

An instant number of skipped frame $\tilde{S}_c(n)$ due to insufficient computational resources is then given by $$\tilde{S}_c(n)=\lfloor TST(n)*F_r\rfloor \quad (17)$$

and the average number of skipped frames due to insufficient computational resources $S_c(n)$ is given by $$S_c(n)=\lfloor(1-\theta)S_c(n-1)+\theta*\tilde{S}_c(n)\rfloor \quad (18)$$

wherein $\theta$ is $0<\theta<1$, and is preferably set at a value of 0.125. The initial value of $S_c(n)$ is given by $$S_c(0)=0 \quad (19)$$

The target buffer level for the P-frame can now be determined using the following equation (step 110):

$$Target(n) = \qquad (20)$$
$$Target(n-1) - \frac{B_c(t_{i,l}) - \delta * B_s}{N_{gop} - 1} * \sum_{j=0}^{N_{pos}(n-1)+S_c(n-1)} W_{pos}(n+j)$$

wherein
Target(n) is the target buffer level,
$N_{gop}$ is the number of frames in a GOP, and
$W_{pos}(l)$ is the position weight of the $l^{th}$ Inter-frame which satisfies $$\sum_{l=1}^{N_{gop}-1} W_{pos}(l) = N_{gop} - 1$$

and $$W_{pos}(1) \leq W_{pos}(2) \leq \ldots \leq W_{pos}(N_{gop} - 1).$$

As the R-D model is not exact, there is usually a difference between the target buffer level for each frame and the actual buffer occupancy. A target bit rate is thus computed for each frame to maintain the actual buffer occupancy to be target buffer level. The target bit rate for each frame is determined by:

$$\tilde{f}(n) = \max\{0, u(t_{n,i}) * \max\{T_{ave}(n-1), T_{f,i}(n)\} + (\gamma-1)(B_c(t_{n,i}) - Target(n))\} \quad (21)$$

wherein
$\tilde{f}(n)$ is the target bit rate,
$t_{n,i}$ is the time instant the $n^{th}$ P-frame in the $i^{th}$ GOP is coded, and
$\gamma$ is a constant which is $0<\gamma<1$, and is preferably set at a value of 0.25.

Since the available channel bandwidth $u(t_{n,i})$ and the average coding time interval $T_{ave}(n-1)$ are used to determine the target bit rate for each P-frame, the bit rate control method according to the invention is adaptive to the channel bandwidth and the computational resources.

Further adjustment to the target bit rate can be made using the following weighted temporal smoothing equation:

$$f(n) = \max\left\{\frac{u(t_{n,i}) * \max\{T_{ave}(n-1), T_{f,i}(n)\}}{3} + H_{hdr}(n-1),\right. \qquad (22)$$
$$\left. \mu \times \tilde{f}(n) + (1-\mu) \times f(n-1)\right\}$$

wherein
f(n) is the smoothed target bit rate,
$\mu$ is a weighting control factor constant which is set preferably at a value of 0.5, and
$H_{hdr}(n)$ is the amount of bits used for shape information, motion vector and header of previous frame.

Once the target bit rate is determined, bits are allocated to each P-frame based on this target bit rate (step 112). The corresponding quantization parameter Q is also calculated (step 113) using the method disclosed in [5]. The corresponding quantization parameter Q is then used for coding the P-frame (step 114).

After the coding of the P-frame is complete, the parameters of the R-D model is updated and the number of skipped frames due to buffer overflow are determined in the post-encoding stage (step 104, 105), respectively, using the method disclosed in [5].

In a further step of the post-encoding stage (step 106), the sleeping time of the encoding process after the current frame is determined using the following equation:

$$ST_c(n) = \max\left\{\frac{1}{F_r} - RT_{st}(n-1) - \max\{T_{fi}(n), T_c(n)\}, 0\right\} + \frac{N_{post}(n)}{F_r} \quad (23)$$

wherein $ST_c(n)$ is the sleeping time of the encoding process.

The starting encoding time of the next frame can then be obtained using the following equation:

$$SCT(n) = T_c(n) + SCT(n-1) + ST_c(n) \qquad (24)$$

wherein SCT(n) is the starting encoding time. The starting decoding time for the next frame can then be obtained using the following equation (step 107):

$$SDT(n) = \frac{\lfloor SCT(n) * F_r \rfloor}{F_r} \qquad (25)$$

wherein SDT(n) is the starting decoding time. The SDT(n) for the next frame is then transmitted to the decoder to decode the next frame at the time indicated by SDT(n).

It should be noted that in the determination of $ST_c(n)$ and SDT(n), no frame is encoded twice, the time resolution is $1/F_r$, and necessary time should be elapsed when the buffer is in danger of overflow.

To demonstrate that the objective of the rate control method according to the invention has been met, the rate control method according to the invention and the rate control method used in the standard MPEG-4 encoding device are applied to two video sequences, and their performances are compared accordingly.

Figure 2:
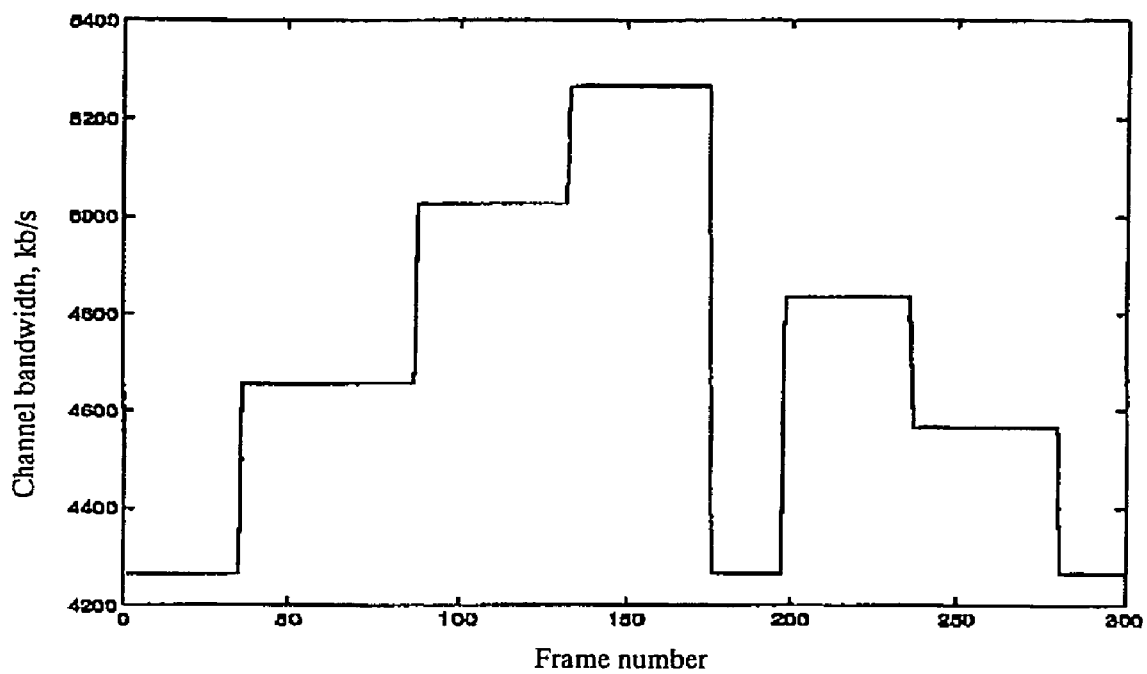
FIG. 2 shows the channel bandwidth used for each frame of the "weather" and "children" video sequences.
Figure 3:
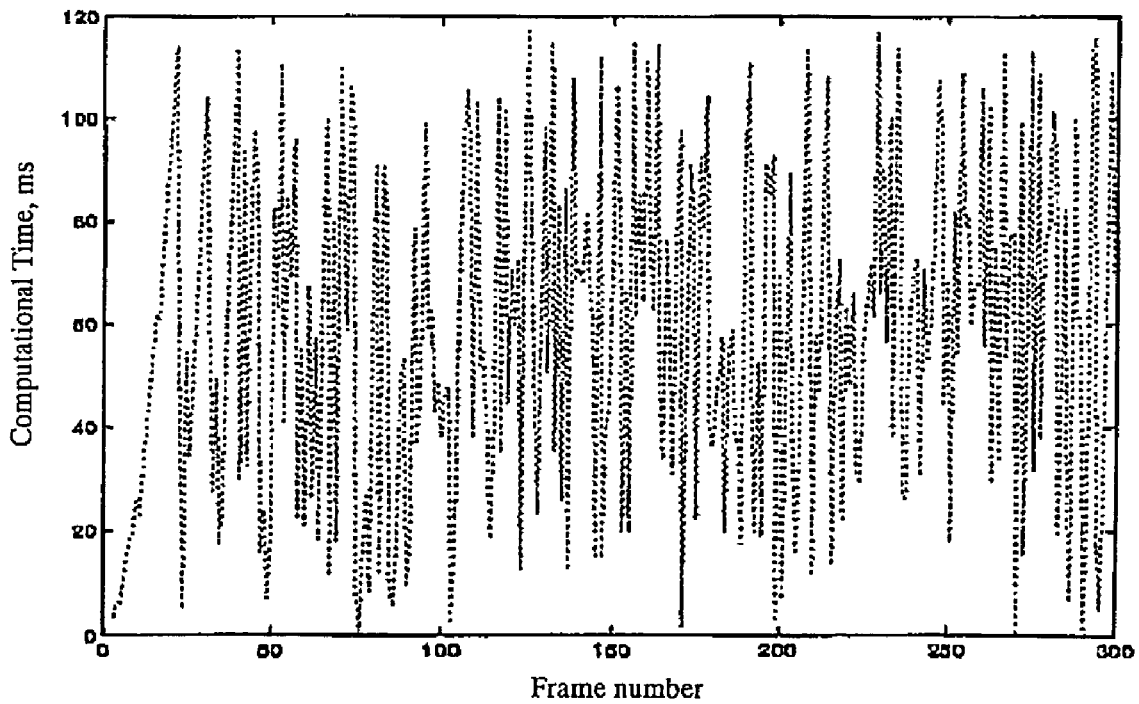
FIG. 3 shows the computation time needed to encode each frame of the "weather" and "children" video sequences using the preferred embodiment of the invention.

The two video sequences are referred as "weather" and "children", respectively, and are in the size of QCIF. The predefined frame rate, $F_c$, is 30 fps (frames per second), and the length of each GOP is 50. The available channel bandwidth and the computation time used for encoding each frame of the video sequence are shown in FIG. 2 and FIG. 3, respectively.

The actual frame rate is above 17 fps, which is less than the predefined frame rate of 30 fps. The initial buffer fullness is set at $B_s/8$ and the initial quantization parameter $Q_0$ is set at 15.

Figure 4:
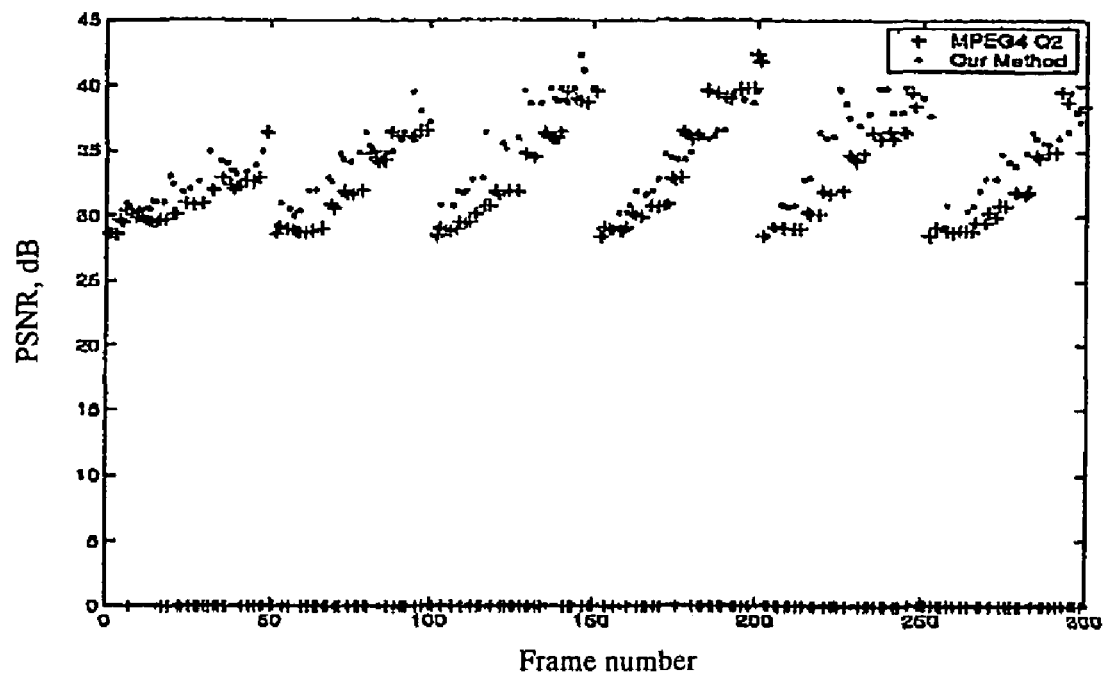
FIG. 4 shows the comparison of the PSNR for the "weather" video sequence.
Figure 5:
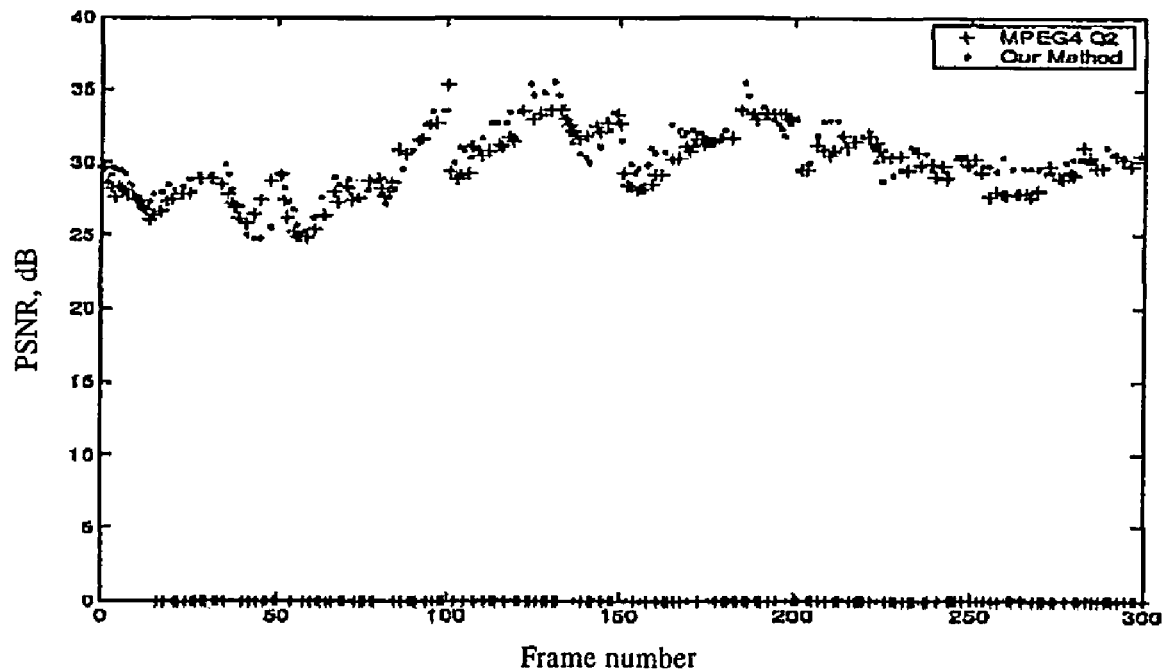
FIG. 5 shows the comparison of the PSNR for the "children" video sequence.

FIG. 4 and FIG. 5 show the Peak Signal-to-Noise Ratio (PSNR) of the "weather" and "children" video sequence using the rate control method according to the invention and the rate control method used in MPEG-4, respectively.

The average PSNR of the "weather" video sequence using the rate control method according to the invention is 34.16 dB, wherein the average PSNR of the "weather" video sequence using the rate control method used in MPEG-4 is 32.6 dB. Similarly, the average PSNR of the "children" video sequence using the rate control method according to the invention is 30.51 dB, wherein the average PSNR of the "children" video sequence using the rate control method used in MPEG-4 is 29.87 dB.

Therefore, it can be seen that the average PSNR of the video sequences using the rate control method according to the invention is higher than using the rate control method of MPEG-4.

Figure 6:
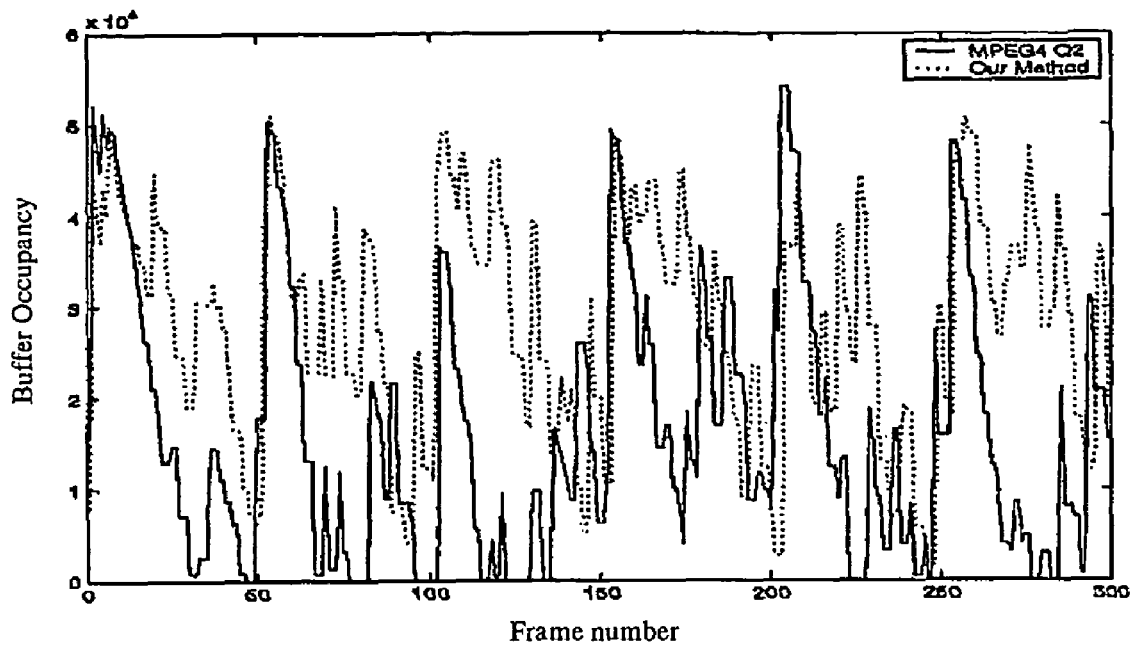
FIG. 6 shows the comparison of the actual buffer occupancy for the "weather" video sequence.
Figure 7:
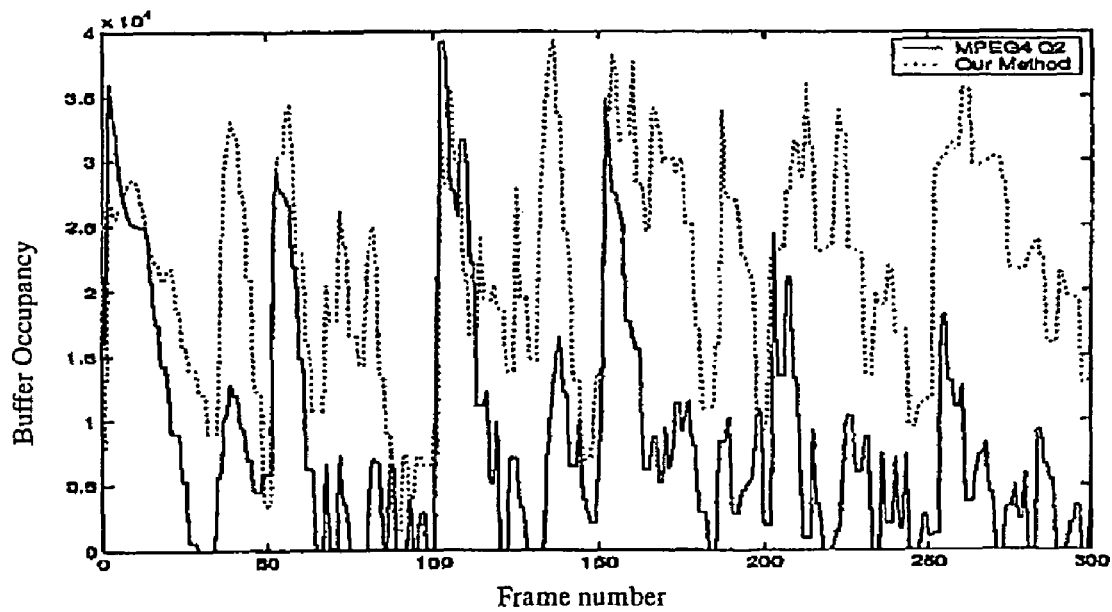
FIG. 7 shows the comparison of the actual buffer occupancy for the "children" video sequence.

FIG. 6 and FIG. 7 show the actual buffer occupancy for the "weather" and "children" video sequences using the rate control method according to the invention and the rate control method used in MPEG-4, respectively.

As can be seen from FIG. 6 and FIG. 7, the occurrence of buffer underflow using the rate control method of MPEG-4 is 12 times for the "weather" video sequence and 18 times for the "children" video sequence. There is no buffer underflow for the two videos sequences using the rate control method according to the invention.

The following documents are used in this specification:

[1] H. J. Lee and T. H. Chiang and Y. Q. Zhang. Scalable Rate Control for MPEG-4 Video. IEEE Trans. Circuit Syst. Video Technology, 10: 878-894, 2000.

[2] T. Chang and Y. Q. Zhang. A new rate control scheme using quadratic rate-distortion modeling. IEEE Trans. Circuit Syst. Video Technology, 7: 246-250, 1997.

[3] J. Ribas-Corbera and S. Lei. Rate control in DCT video coding for low-delay communications. IEEE Trans. Circuit Syst. Video Technology, 9: 172-185, 1999.

[4] A. Vetro, H. Sun and Y. Wang. MPEG-4 rate control for multiple video objects. IEEE Trans. Circuit Syst. Video Technology, 9: 186-199, 1999.

[5] Z. G. Li, X. Lin, C. Zhu and F. Pan. A novel rate control scheme for video over the internet. In Proceedings ICASSP 2002, Fla, USA, Vol.2, pp. 2065-2068, May 2002.

[6] Z. G. Li, N. Ling, C. Zhu, X. K. Yang, G. N. Feng, S. Wu and F. Pan. Packetization algorithm for MPEG-4 Fine Granularity Scalability over the internet. In the 3$^{rd}$ workshop and Exhibition on MPEG-4, USA, Calif, pp. 17-20, Jun. 25-27, 2002.

What is claimed is:

1. A method for controlling the encoding rate of an encoder for encoding a video sequence, wherein the video sequence comprises a plurality of Group Of Pictures, wherein each Group of Picture comprises at least an I-frame and an Inter-frame, the method comprising the following for the encoding of each Inter-frame in the Group of Picture:

Determining a desired frame rate based on an available bandwidth of a channel which is used for transmitting the video sequence and on available computational resources for the encoding process;

Determining a target buffer level based on the desired frame rate and the position of the Inter-frame with respect to the I-frame;

Determining a target bit rate based on the target buffer level and the available channel bandwidth, wherein the target bit rate is used for controlling the rate for encoding the video sequence;

Determining a target encoding time interval for the Inter-frame that is determined based on the available channel bandwidth and an average encoding time interval used for encoding the Inter-frame, wherein the average encoding time interval for the Inter-frame is proportional to the available computational resources for the encoding process; and Determining the desired frame rate based on the determined target encoding time interval.

2. The method for rate control according to claim 1, wherein the target encoding time interval for the Inter-frame is determined using the following equations:

$$T_{fi}(n)=A_1*T_{fi}(n-1) \text{ if } B_{mad}(n)>B_1*TB_{mad}(n),$$

$$T_{fi}(n)=A_2*T_{fi}(n-1) \text{ if } B_{mad}(n)<B_2*TB_{mad}(n),$$

$$T_{fi}(n)=T_{fi}(n-1) \text{ otherwise,}$$

wherein $T_{fi}(n)$ is the target encoding time interval for the Inter-frame, $A_1$ is a parameter wherein $0.80<A_1<1.00$, $A_2$ is a parameter wherein $1.00<A_2<1.10$, $B_1$ is a parameter wherein $1.00<B_1<2.00$, $B_2$ is a parameter wherein $0<B_2<1.00$, $TB_{mad}(n)$ is the average of $B_{mad}(n)$, and $B_{mad}(n)$ is defined as $$B_{mod}(n) = \frac{u(n)\max\{T_{ave}(n-1), T_{fi}(n-1)\}}{MAD(n)}$$

wherein u(n) is the available channel bandwidth,

Tave(n−1) is the average encoding time interval for the Inter-frame, and

MAD(n) is the mean absolute difference between the current frame and the previous frame.

3. The method for rate control according to claim 2, wherein the target encoding time interval is further adjusted by $$T_{fi}(n) = \min\left\{\frac{5}{4F_r}, \max\left\{\frac{3}{4F_r}, T_{fi}(n)\right\}\right\}.$$

4. The method for rate control according to claim 1, wherein the average encoding time interval for the Inter-frame is determined based on an actual encoding time interval for the Inter-frame.

5. The method for rate control according to claim 4, wherein the average encoding time interval for the Inter-frame is further determined based on the target encoding time interval and the number of skipped frames due to buffer overflow.

6. The method for rate control according to claim 5, wherein the average encoding time interval for the Inter-frame is determined using the following equation:

$$T_{ave}(n) = (1-x)T_{ave}(n-1) + \chi*\max\left\{T_c(n), \frac{1}{F_r} - RT_{st}(n-1)\right\}$$

wherein $\chi$ is a weighting factor,

Tc(n) is the actual encoding time,

Fr is a predefined frame rate, and

RTst is further defined as $$RT_{st}(n) = 0 \text{ if } \max\{T_c(n), T_{fi}(n)\} < \frac{1}{F_r} - RT_{st}(n-1) \text{ or } N_{post}(n) > 0,$$

$$RT_{st}(n) =$$

$$\{T_c(n), T_{fi}(n)\} + RT_{st}(n-1) - \frac{\lfloor (\max\{T_c(n), T_{fi}(n)\} + RT_{st}(n-1))F_r \rfloor}{F_r}$$

otherwise, wherein $N_{post}(n)$ is the number of skipped frames due to buffer overflow.

7. The method for rate control according to claim 3, wherein the target buffer level is determined such that an Inter-frame which is nearer to the I-frame in the GOP has a higher target buffer level compared to another Inter-frame which is further from the I-frame belonging to the same GOP.

8. The method for rate control according to claim 7, wherein the target buffer level is determined using the following equation:

$$\text{Target}(n) = \text{Target}(n-1) - \frac{B_c(t_{i,l}) - \delta * B_s}{N_{gop} - 1} * \sum_{j=0}^{N_{post}(n-1)+S_c(n-1)} W_{pos}(n+j)$$

wherein

Target(n) is the target buffer level,

Ngop is the number of frames in a GOP,

Bs is the buffer size,

Bc is the actual buffer occupancy,

Sc is an average number of skipped frames due to insufficient available computational resources for encoding the Inter-frame according to the desired frame rate, and $W_{pos}(l)$ is the position weight of the $l^{th}$ Inter-frame which satisfies $$\sum_{l=1}^{N_{gop}-1} W_{pos}(l) = N_{gop} - 1$$

and $$W_{pos}(1) \leq W_{pos}(2) \leq \ldots \leq W_{pos}(N_{gop}-1).$$

9. The method for rate control according to claim 8, wherein the average number of skipped frames due to insufficient available computational resources for encoding the Inter-frame according to the desired frame rate is determined based on an instant number of skipped frames due to the insufficient computational resources while encoding the Inter-frame.

10. The method for rate control according to claim 9, wherein the instant number of skipped frames due to insufficient computational resources is determined based on the actual encoding time interval and the target encoding time interval.

11. The method for rate control according to claim 10, wherein the instant number of skipped frames is determined using the following equation:

$$\tilde{S}_c(n) = \lfloor TST(n) * F_r \rfloor$$

wherein TST(n) is further defined as $$TST(n) = \max\left\{0, \tilde{T}\tilde{S}\tilde{T}(n-1) + \max\{T_c(n), T_{fi}(n)\} - \frac{1}{F_r}\right\}$$

and $\tilde{T}\tilde{S}\tilde{T}(n-1)$ is defined as $$\tilde{T}\tilde{S}\tilde{T}(n-1) = TST(n-1) - \frac{\lfloor TST(n-1)*F_r \rfloor}{F_r}$$

wherein $\tilde{S}_c(n)$ is the instant number of skipped frames due to insufficient computational resources, Tc(n) is the actual encoding time interval, and Fr is a predefined frame rate.

12. The method for rate control according to claim 11, wherein the average number of skipped frames due to insufficient computational resources is determined using the following equation:

$$S_c(n) = \lfloor (1-\theta)S_c(n-1) + \theta * \tilde{S}_c(n) \rfloor$$

wherein

θ is a weighting factor.

13. The method for rate control according to claim 12, wherein the target bit rate is determined based on the average encoding time interval for the Inter-frame, the average number of skipped frames due to insufficient computational resources, the target buffer level, the available channel bandwidth and actual buffer occupancy.

14. The method for rate control according to claim 6, wherein the target bit rate is determined using the following equation:

$$\tilde{f}(n) = \max\{0, u(t_{n,i}) * \max\{T_{ave}(n-1), T_{fi}(n)\} + (\gamma-1)(B_c(t_{n,i}) - \text{Target}(n))\}$$

wherein $\tilde{f}(n)$ is the target bit rate, tn,i is the time instant the nth Inter-frame in the ith GOP is coded, and γ is a constant.

15. The method for rate control according to claim 14, wherein the target bit rate is further adjusted by a weighted temporal smoothing using $$f(n) = \max\left\{\frac{u(t_{n,i}) * \max\{T_{ave}(n-1), T_{f,i}(n)\}}{3} + H_{hdr}(n-1),\right.$$

$$\left. \mu \times \tilde{f}(n) + (1-\mu) \times f(n-1)\right\}$$

wherein f(n) is the smoothed target bit rate,

μ is a weighting control factor constant, and

Hhdr(n) is the amount of bits used for shape information, motion vector and header of previous frame.

16. The method for rate control according to claim 1, further comprising:

Determining a time delay of each frame after the frame is coded,

Determining a starting encoding time of each of the frame based on the computed time delay, Determining a starting decoding time of a next frame based on the computed starting encoding time, and Transmitting the determined starting decoding time to a decoder which is designed for decoding the video sequences.

17. The method for rate control according to claim 16, wherein the time delay is determined according to the following formula:

$$ST_c(n) = \max\left\{\frac{1}{F_r} - RT_{st}(n-1) - \max\{T_{fi}(n), T_c(n)\}0\right\} + \frac{N_{post}(n)}{F_r}$$

wherein $ST_c(n)$ is the time delay of the coding process.

18. The method for rate control according to claim 17, wherein the starting encoding time is determined according to the following formula:

$$SCT(n) = T_c(n) + SCT(n-1) + ST_c(n)$$

wherein SCT(n) is the starting encoding time.

19. The method for rate control according to claim 18, wherein the starting decoding time is determined according to the following formula:

$$SDT(n) = \frac{\lfloor SCT(n) * F_r \rfloor}{F_r}$$

wherein SDT(n) is the starting decoding time.

20. An apparatus for controlling the rate for encoding a video sequence, wherein the video sequence comprises a plurality of Group Of Pictures, wherein each Group of Picture comprises at least and I-frame and an Inter-frame, the apparatus comprises a processing unit being adapted to perform the following steps for the encoding of each Inter-frame in the Group of Picture:

Determining a desired frame rate based on an available bandwidth of a channel which is used for transmitting the video sequence and on available computational resources for the encoding process;

Determining a target buffer level based on the desired frame rate and the position of the Inter-frame with respect to the I-frame;

Determining a target bit rate based on the target buffer level and the available channel bandwidth, wherein the target bit rate is used for controlling the rate for encoding the video sequence;

Determining a target encoding time interval for the Inter-Frame that is determined based on the available channel bandwidth and an average encoding time interval used for encoding the Inter-frame, wherein the average encoding time interval for the Inter-frame is proportional to the available computational resources for the encoding process; and Determining the desired frame rate based on the determined target encoding time interval.

21. The apparatus according to claim 20, being a video encoding device, wherein the target buffer level is determined based on the complexity of the Inter-frame.

22. A method for controlling the encoding rate of an encoder for encoding a video sequence, wherein the video sequence comprises a plurality of Group Of Pictures, wherein each Group of Picture comprises at least an I-frame and an Inter-frame, the method comprising the following for the encoding of each Inter-frame in the Group of Picture:

Determining a desired frame rate based on an available bandwidth of a channel which is used for transmitting the video sequence and on available computational resources for the encoding process;

Determining a target buffer level based on the desired frame rate and the position of the Inter-frame with respect to the I-frame;

Determining a target bit rate based on the target buffer level and the available channel bandwidth, wherein the target bit rate is used for controlling the rate for encoding the video sequence;

Determining a target encoding time interval for the Inter-frame that is determined based on the available channel bandwidth and an average encoding time interval used for encoding the Inter-frame, wherein the average encoding time interval for the Inter-frame is proportional to the available computational resources for the encoding process;

Determining the desired frame rate based on the determined target encoding time interval;

Determining a time delay of each frame after the frame is coded,

Determining a starting encoding time of each of the frame based on the computed time delay, Determining a starting decoding time of a next frame based on the computed starting encoding time; and Transmitting the determined starting decoding time to a decoder which is designed for decoding the video sequences.

23. The method for rate control according to claim 22, wherein the time delay is determined according to the following formula:

$$ST_c(n) = \max\left\{\frac{1}{F_r} - RT_{st}(n-1) - \max\{T_{fi}(n), T_c(n)\}, 0\right\} + \frac{N_{post}(n)}{F_r}$$

wherein $ST_c(n)$ is the time delay of the coding process.

24. An apparatus for controlling the rate for encoding a video sequence, wherein the video sequence comprises a plurality of Group Of Pictures, wherein each Group of Picture comprises at least and I-frame and an Inter-frame, the apparatus comprises a processing unit being adapted to perform the following steps for the encoding of each Inter-frame in the Group of Picture:

Determining a desired frame rate based on an available bandwidth of a channel which is used for transmitting the video sequence and on available computational resources for the encoding process;

Determining a target buffer level based on the desired frame rate and the position of the Inter-frame with respect to the I-frame;

Determining a target bit rate based on the target buffer level and the available channel bandwidth, wherein the target bit rate is used for controlling the rate for encoding the video sequence;

Determining a target encoding time interval for the Inter-Frame that is determined based on the available channel bandwidth and an average encoding time interval used for encoding the Inter-frame, wherein the average encoding time interval for the Inter-frame is proportional to the available computational resources for the encoding process;

Determining the desired frame rate based on the determined target encoding time interval;

Determining a time delay of each frame after the frame is coded,

Determining a starting encoding time of each of the frame based on the computed time delay, Determining a starting decoding time of a next frame based on the computed starting encoding time; and Transmitting the determined starting decoding time to a decoder which is designed for decoding the video sequences.

25. The apparatus of claim 24 wherein the time delay is determined according to the following formula:

$$ST_c(n) = \max\left\{\frac{1}{F_r} - RT_{st}(n-1) - \max\{T_{fi}(n), T_c(n)\}, 0\right\} + \frac{N_{post}(n)}{F_r}$$

wherein $ST_c(n)$ is the time delay of the coding process.

* * * * *